United States Patent [19]

Dick

[11] Patent Number: 5,231,868
[45] Date of Patent: Aug. 3, 1993

[54] CONTINOUS CONTAINMENT MONITORING WITH CONTAINMENT PRESSURE FLUCTUATION

[75] Inventor: Jerry E. Dick, Mississauga, Canada

[73] Assignee: Atomic Energy of Canada Limited/Energie Atomique du Canada Limitee, Ottawa, Canada

[21] Appl. No.: 789,592

[22] Filed: Nov. 8, 1991

[30] Foreign Application Priority Data

Nov. 9, 1990 [CA] Canada .................................. 2029545

[51] Int. Cl.$^5$ .......................................... G01M 3/32
[52] U.S. Cl. ............................................... 73/49.3
[58] Field of Search ................................ 73/49.3, 40

[56] References Cited

U.S. PATENT DOCUMENTS

| | | |
|---|---|---|
| 3,258,403 | 6/1966 | Malay . |
| 3,444,725 | 3/1969 | Chave . |
| 4,076,585 | 2/1978 | Cachera . |
| 4,081,323 | 3/1978 | Gans, Jr. et al. . |
| 4,445,364 | 5/1984 | Steiff et al. . |
| 4,485,729 | 12/1984 | Crittenden et al. . |
| 4,493,207 | 1/1985 | Dempsey . |
| 4,517,826 | 3/1985 | Cole et al. . |
| 4,635,469 | 1/1987 | Modera et al. . |

OTHER PUBLICATIONS

J. F. Lafortune, C. A. McDewitt, S. Poolpol, "Suitability Study of On-Line Leak Tests for CANDU Single-Unit Containment Buildings", Nuclear Journal of Canada, vol. 1, No. 4, Dec. 1987.
P. Keogh, "The PWR Integrated Leak Rate Test, A Review of Experiences and Results", Nuclear Engineering and Design, 1985.
G. D. Zakaib, "On-Power Containment Integrity Monitoring in CANDU Multi-Unit Stations", Nuclear Engineering and Design, 1985.
C. Lipson, J. J. Sheth, "Statistical Design and Analysis of Engineering Experiments", McGraw-Hill, 1973.
R. H. Mills, "Gas and Water Permeability of Concrete for Reactor Scale Specimens", INFO-0188-2, Atomic Energy Control Board, Feb. 1987.
H. T. Hill, "A Successful Approach to Containment Integrated Leakage Rate Testing", International Conference on Containment Design and Operation, Oct. 14-17, 1990, Toronto.
J. E. Dick and D. R. Pendergast, "The Role of Weather Variations in Estimates of Leakage From Containment", International Conference Proceedings, Toronto, 1984.

Primary Examiner—Hezron E. Williams
Assistant Examiner—Joseph W. Roskos
Attorney, Agent, or Firm—Dressler, Goldsmith, Shore, Sutker & Milnamow, Ltd.

[57] ABSTRACT

A method of determining the rate of air leakage from or into a containment is described. The internal pressure of the containment is maintained at a positive or negative value with reference to ambient air pressure and the air mass changes are continuously monitored through measurements of pressure, temperature, relative humidity and free volume. Air leakage is measured through a mass balance equation and a regression analysis carried out to yield constants which characterize the various features of the leakage flow and give an indication of the accuracy of the results.

4 Claims, 2 Drawing Sheets

Measurements for Continuous Air Mass Monitoring

CONTINOUS CONTAINMENT MONITORING WITH CONTAINMENT PRESSURE FLUCTUATION

BACKGROUND OF THE INVENTION

This invention relates to the monitoring of the integrity of containments particularly but not exclusively for nuclear plants.

In Canada, nuclear reactor containments may be single unit designs in which individual reactors are housed by their own independent containment, or multi-unit designs in which the containment provisions or portions thereof are shared by a number of reactors on the same site. While this application is primarily concerned with containment monitoring in the context of the single unit design, it is expected that the concepts presented will be universally applicable to any containment design, including containments for non-nuclear applications such as biological laboratories.

Most containments are equipped with ventilation systems and other auxiliary systems which penetrate the containment boundary. In the event of an accident, isolation valves on all of the major lines will automatically close to isolate the containment atmosphere from the outside environment. The isolation valves are built to rigid standards and tested frequently to ensure that closure speeds and leakage characteristics will preclude radionuclide releases in excess of allowable levels. Hence, known breaches are dealt with as a part of normal containment design.

However, impairments or inadvertent breaches of the containment envelope, such as seal failures or valves left in improper states, can occur during the life of the plant. These breaches are easily identified in integrated leakage rate tests, but as such tests involve reactor shutdown, containment isolation, and subsequent pressurization or depressurization to nonatmospheric levels, they are normally performed on an infrequent (years) basis. Hence, inadvertent breaches can remain undetected for significant periods of time.

The nuclear industry has long been interested in a means of monitoring containment integrity on a continuous basis, that is, while the reactor is operating normally. However, absolute success has been thwarted, in part, by the need to reliably distinguish inadvertent breaches from the legitimate breaches represented by system penetrations (such as the ventilation system). Consideration has been given to schemes such as natural resonance of the containment atmosphere, tracer decay approaches, and close monitoring of the containment pressure response signature to selected periodic pressure forcing functions.

From these investigations, the most promising approach appears to be to employ sensors and systems which automatically measure changes in the mass of air in containment, time-integrate any known air mass flow rates across containment boundaries and perform a mass balance to obtain the air mass leaked. However, as fluctuations in such measurements are typically too large to enable leakage to be calculated to the desired precision, filtering and statistical techniques must be employed to filter out random and time-dependent fluctuations. Current approaches cannot easily deal with non-random or systematic fluctuations in the measurements, such as pressure changes within the containment. As a result, sampling periods must be kept short or data measured during periods of varying containment conditions must be discarded.

Continuous monitoring of the mass in containment involves first determining the free volume of the containment and then continuously measuring the pressure, temperature and humidity throughout the containment, as well as the outside atmosphere. The presence of additional gas, if any, would require measurement also. The above parameters are sufficient to determine the air mass leakage across the containment boundary by a simple mass balance.

Trans-boundary flows present no problem in principle as long as they can be measured with sufficient precision to be included in the mass balance without obscuring the true leakage rate. The problem is that the leakage for nuclear containments is so small relative to the contained air mass and the integrated trans-boundary flows that instrument noise and drift as well as random and systematic fluctuations in the measured variables tend to mask the estimated leakage. To separate the random variations from the data, it is thus common practice to employ statistical techniques.

There are a number of methods for dealing with continuous mass measurements but only the so-called "mass point" method will be herein considered. Firstly, the governing mass balance equation (see LaFortune (1)) may be written as $$y = (\dot{m}_{in} - \dot{m}_{out})t + M_{acc}(LR)t$$

where, $\dot{m}_{in}$ = known air mass flow rate into containment (kg/hr)
$\dot{m}_{out}$ = known air mass flow rate out of containment (kg/hr)
$M_{acc}$ = air mass change in containment (kg)
$LR$ = air leakage rate (kg/hr)
$t$ = time (hr)

The "mass point" method consists of a linear regression of the contained mass over time and use of the slope of the regression line as the leak rate and the intercept as the initial contained mass. Reference 2 (Keogh) recommends this approach as the only method to be used. However, the weakness in this technique is an implicit assumption that the leakage rate is independent of pressure.

Reference 3 (Zakaib) also discusses this method and indicates that, in practice, some of the basic assumptions for linear regression are often violated, for example the assumption of normally distributed and independent random errors. Systematic errors due to actual physical variations in containment conditions (common during on-power testing) are thus incompatible with this approach and must be limited in magnitude.

SUMMARY OF THE INVENTION

It is an object of this invention to provide a technique for measuring the magnitude of containment leakage which is not invalidated by systematic variations in the measured variables, for example pressure and/or temperature.

It is a more specific object to establish the nature of the leakage (laminar, turbulent or a combination) and identify the presence of systematic errors in parameters other than pressure.

Broadly, the invention provides a method of determining the leakage characteristics of the boundaries of an essentially hermetic volume comprising; maintaining the internal pressure of the volume at a value different from the ambient air pressure; continuously monitoring air mass changes within the volume preferably through measurements of pressure, temperature, relative humidity, and free volume; and reducing the error due to random variations in the measured variables for whatever cause by statistical regression on two or more variables or dimensions.

According to a more specific aspect of the invention the acquisition steps similar to those effected by LaFortune are carried out but the mass balance equation used by LaFortune, namely $$y = (\dot{m}_{in} - \dot{m}_{out})t + m_{acc} = (LR)t \tag{1}$$

is re-written $$y = (\dot{m}_{in} - \dot{m}_{out} + \dot{M}_{acc})t = k(\Delta P)^{1a_1}t^{2a} \tag{2}$$

where
$\Delta P$ = pressure differential across the containment envelope
k = leakage rate constant
$a_1$ and $a_2$ are constants.

Thereafter, a regression analysis, preferably a linear multiple logarithmic regression analysis, is performed on equation (2) to yield constants k, $a_1$ and $a_2$ which characterize the various features of the leakage flow. A standard error of estimate for the regression plane can also be computed.

BRIEF DESCRIPTION OF THE DRAWINGS

For a fuller understanding of the invention, reference should be had to the following detailed description of the preferred embodiment of the invention, taken in conjunction with the accompanying drawings, in which.

DETAILED DESCRIPTION OF THE PREFERRED EMBODIMENT OF THE INVENTION

Figure 1:
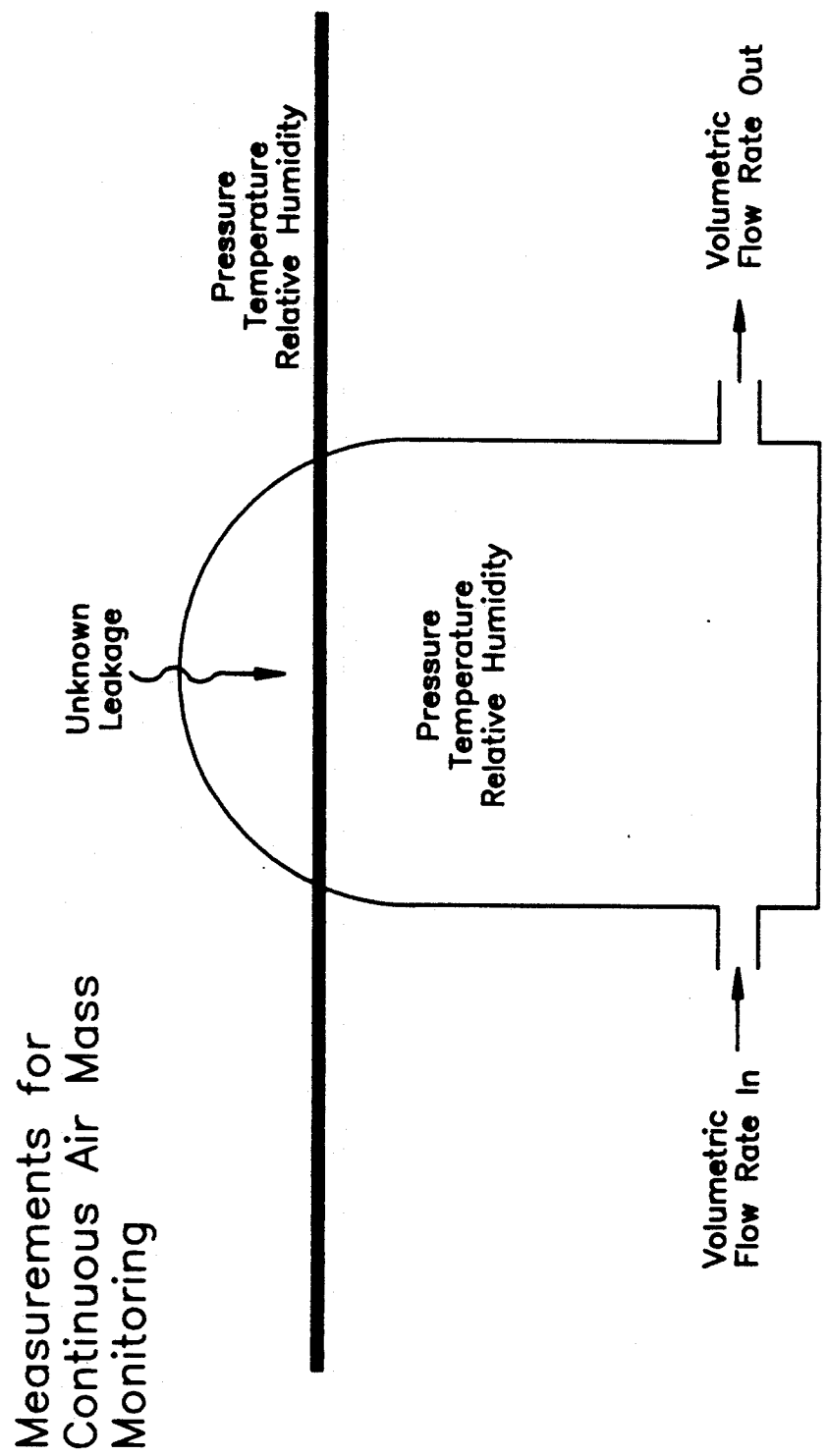
FIG. 1 shows schematically how the leakage monitoring is performed.

The proposed leakage monitoring is based on an air mass balance performed continuously while the container building is kept within its operating pressure range (normally negative but possible positive) by removing the air through suitably engineered exhaust flow.

Values for $m_{in}$, $m_{out}$ and $M_{acc}$ have to be established for the containment and substituted into equation (2) after which a regression analysis on the independent variables $\Delta P$ and t is carried out.

The values for $m_{in}$, $m_{out}$ and $M_{acc}$ are established by continuously measuring parameters such as pressure, temperature, relative humidity and transboundary flows using a network of monitors and converting these parameters using known equations to values for $\dot{m}_{in}$, $\dot{m}_{out}$ and $\dot{M}_{acc}$. American National Standard ANSI/ANS-56.8-1987 establishes how these various parameters should be measured and reference 12, although not directed to continuous testing, provides further detailed information on how the data may be gathered.

It should be pointed out that temperature and relative humidity must be measured at a large enough number of locations to obtain an extremely accurate representation of the air mass.

Typically, measurements are made every 30 seconds and fed to a computer which stores the data and performs the statistical analyses required. After about 12 hours of data a leakage rate estimate can be obtained.

As indicated above the actual manner of obtaining the data and deriving values for $m_{in}$, $m_{out}$ and $M_{acc}$ has been suggested in the art and does not per se constitute the present invention: By way of example, however, the value $M_{acc}$ can be derived from measurements of pressure, temperature and relative humidity at a number of points in time. Firstly, using the ideal gas law, the mass M of air in the containment is measured using $$M = \frac{(P - P_v)V}{RT_{air}}, kg$$

where
P = absolute containment pressure, kPa
$P_v$ = water vapour partial pressure, kPa
V = net free volume of containment $M^3$
R = gas constant for air = 0.2871 kPa $M^3$/kg(air)k
$T_{air}$ = average temperature, k.

The mass flow rates $m_{in}$ and $m_{out}$ across containment boundaries can be monitored by direct flow measurement with a suitable correction for measured vapour content.

The value of $M_{acc}$ may be obtained in several ways. The simplest way would be to subtract the computed value of M at one point in time from the computed value at the previous time and dividing the difference by the time interval separating the two measurements. A more accurate way would be to perform a non-linear regression on a series of computed values for M to obtain an equation which would represent the variation of M with time. This equation would be differentiated and $M_{acc}$ would be the value of the derivative at the time corresponding to the time of measurement for $m_{in}$ and $m_{out}$. The resulting set of values for $m_{in}$, $m_{out}$ and $M_{acc}$ are to be used in the planar regression which will now be described.

The first step in the regression analysis is to linearize equation 2 according to the procedure of Reference 4, Table 13.1, reproduced below.

TABLE 13.1

| | Linearized forms of some nonlinear equations | | | |
|---|---|---|---|---|
| | | | Linearized variables | |
| Nonlinear equation | Linearized equation | Y | X | Z |
| 1. $y = 1 - e^{-a_0 x}$ (Exponential) | $\ln \frac{1}{1-y} = a_0 x$ | $\ln \frac{1}{1-y}$ | $x$ | |
| 2. $y = a_0 + a_1 \sqrt{x}$ (Square root) | $y = a_0 + a_1 X$ | $y$ | $\sqrt{x}$ | |

TABLE 13.1-continued

Linearized forms of some nonlinear equations

| Nonlinear equation | Linearized equation | Y | X | Z |
|---|---|---|---|---|
| 3. $y = 1 - \exp\left[-\left(\frac{x - x_0}{\theta - x_0}\right)^b\right]$ (Weibull) | $\ln\ln\frac{1}{1-y} = -b\ln(\theta - x_0) + b\ln(x - x_0)$ | $\ln\ln\frac{1}{1-y}$ | $\ln(x - x_0)$ | |
| 4. $y = ax^b$ (Logarithmic) | $\ln y = \ln a + b \ln x$ | $\ln y$ | $\ln x$ | |
| 5. $y = a + \frac{b}{x}$ (Inverse) | $y = a + bx$ | $y$ | $\frac{1}{x}$ | |
| 6. $y = e^{(a+bx)}$ | $\ln y = a + bx$ | $\ln y$ | $x$ | |
| 7. $e^y = a_0 x^{a_1}$ | $y = \ln a_0 + a_1 \ln x$ | $y$ | $\ln x$ | |
| 8. $y = a_0(x)^{a_1}(z)^{a_2}$ | $\ln y = \ln a_0 + a_1 \ln x + a_2 \ln z$ | $\ln y$ | $\ln x$ | $\ln z$ |
| 9. $y = a_0 + a_1 x + a_2 \sqrt{z}$ | $y = a_0 + a_1 x + a_2 Z$ | $y$ | $x$ | $\sqrt{z}$ |
| 10. $y = a_0 e^{(a_1 z + a_2 z)}$ | $\ln y = \ln a_0 + a_1 x + a_2 z$ | $\ln y$ | $x$ | $z$ |

This gives:

$$\ln y = \ln k + a_1 \ln (\Delta P) + a_2 \ln t$$

Linear regression of the y vs P, t data produces a least squares plane. The equations are, $$a_0 = \ln K$$

$$a_1 = \frac{(\Sigma XY)(\Sigma Z^2) - (\Sigma XZ)(\Sigma YZ)}{\Sigma X^2 \Sigma Z^2 - (\Sigma XZ)^2}$$

$$a_2 = \frac{(\Sigma X^2)(\Sigma YZ) - (\Sigma YX)(\Sigma XZ)}{\Sigma X^2 \Sigma Z^2 - (\Sigma XZ)^2}$$

$$a_0 = \bar{y} - a_1 \bar{x} - a_2 \bar{z}$$

$$\bar{y} = \frac{1}{n} \sum_{i=1}^{n} \ln y_i$$

$$\bar{x} = \frac{1}{n} \sum_{i=1}^{n} \ln \Delta P_i$$

$$\bar{z} = \frac{1}{n} \sum_{i=1}^{n} \ln t_i$$

$$Y = \ln y_i - \bar{y}$$

$$X = \ln \Delta P_i - \bar{x}$$

$$Z = \ln t_i - \bar{z}$$

The standard error of estimate from Reference 4 is, $$S_{y \cdot xz} = \left[\sum_{i=1}^{n} \ln y_i - a_0 \sum_{i=1}^{n} \ln y_i - a_1 \sum_{i=1}^{n} (\ln x_i + \ln y_i) - a_2 \sum_{i=1}^{n} (\ln z_i + \ln y_i)\right]/n - 3$$

This is the variance of the data relative to the regression plane. (An equation for the distribution of the residuals with respect to the regression plane (needed for confidence estimates) is not given in Reference 4, but can always be calculated from the data.)

The resulting values for $a_0$, $a_1$ and $a_2$ characterize the various features of the leakage flow.

The leakage rate constant, $$k = e^{a_0}$$

is directly proportional to the effective area of the leakage path. A sudden breach producing, say, a doubling of the leakage rate will double the measured k value.

The leakage rate law constant, $a_1$, will show whether the leakage flow is laminar ($a_1 = 1$), turbulent ($a_1 = 0.5$) or a combination of both ($0.5 < a_1 < 1$). Also, it is expected that the absorption/release of air by walls accompanying pressure changes is a laminar-like process. Thus the value of $a_1$ should exhibit temporary reductions for both positive and negative pressure jumps.

The time linearity constant, $a_2$, will usually be unity unless there is a systematic error in one of the measurements. For example, a drift in the measurement of $\dot{m}_{in}$ or $\dot{m}_{out}$ would introduce a false time dependence. The resulting non-linearity would be reflected in the value of $a_2$. Hence, $a_2$, provides a means of judging whether the test is good, and thus the reliability of $a_0$.

The technique described is a process which can be used to monitor containment integrity on a continuous basis and involves no restrictions on variations in containment pressure. It thus allows for much longer sampling periods under conditions of fluctuating containment pressure and eliminates the invalidation of data when the containment pressure fluctuation is non-random. As a result, it should yield a much more precise value for the containment leakage characteristic. The technique also promises to be able to distinguish the presence of systematic errors unrelated to systematic pressure changes and to establish whether the containment leakage characteristic is laminar or turbulent.

While the mechanics of the calculation can be performed in several ways a linear multiple logarithmic regression approach is recommended.

Although the invention has been described in relation to pressure variations, the statistical regression technique can also be applied in relation to temperature. More specifically the mass balance equation would contain T instead of P and the regression analysis would be done on the independent variables T and t.

ILLUSTRATIVE EXAMPLE

Figure 2:
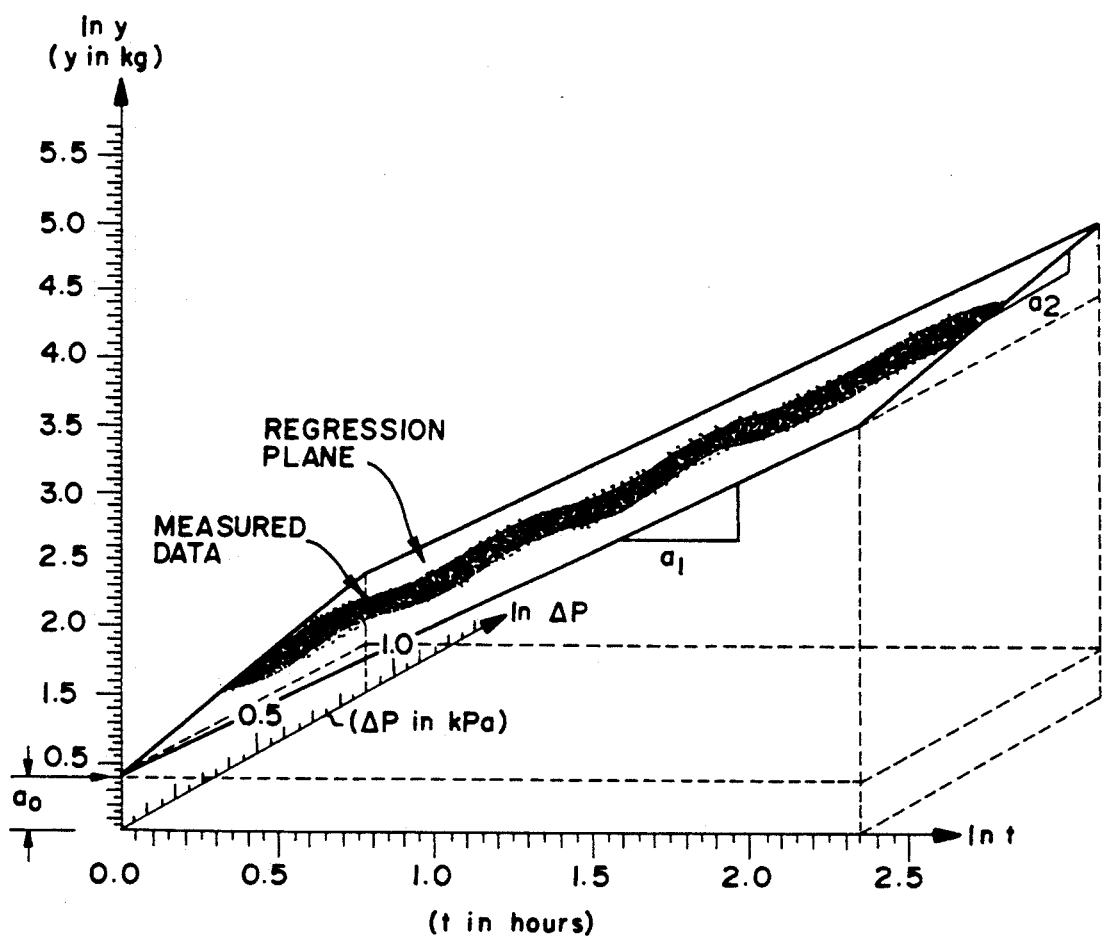
FIG. 2 illustrates a regression plane for a particular containment.

FIG. 2 illustrates the regression plane for a containment having the regression equation, $$y = [1.47 \text{ kg}/(\text{hr} - \text{kPa}^{0.5})] \Delta P^{0.5} t^{1.0} \quad (3)$$

where the units are as follows,
y in kilograms (kg)
$\Delta P$ in kilopascals (kPa)
t in hours (hrs)

The figure depicts how measured data would yield a regression plane which, when extrapolated to the vertical intercept (the imaginary point where $\Delta P$ and t are both unity) identifies the leakage rate constant. It also shows the slopes of the plane in the $\Delta P$ and t directions, which are the exponents of $\Delta P$ and t in Equation 3.

References

1. J. F. Lafortune, C. A. McDewitt, S. Poolpol, "Suitability Study of On-Line Leak Tests for CANDU Single-Unit Containment Buildings", Nuclear Journal of Canada, Vol. 1, No. 4, December 1987.
2. P. Keogh, "The PWR Integrated Leak Rate Test, A Review of Experiences and Results", Nuclear Engineering and Design, 1985.
G. D. Zakaib, "On-Power Containment Integrity Monitoring in CANDU Multi-Unit Stations", Nuclear Engineering and Design, 1985.
4. C. Lipson, J. J. Sheth, "Statistical Design and Analysis of Engineering Experiments", McGraw-Hill, 1973,
5. R. H. Mills, "Gas and Water Permeability of Concrete for Reactor Scale Specimens", INFO-0188-2, Atomic Energy Control Board, February 1987,
6. B. Thate, "D$_2$O in Air Monitoring", M-66-63864, AECL-CO, August 1977,
7. M. Moledina, F. G. Stella, "Pt. Lepreau Nuclear Power Plant Reactor Building D$_2$O Vapour Recovery System", DM-87-38310/63831, AECL-CO, Rev. 2, 81-07-09,
8. J. E. Dick to C. W. Bailey, "C-300 Containment Gross Leakage Monitoring", draft memo Jul. 11, 1988,
J. E. Dick to C. W. Bailey, "Equivalent Orifice Yielding '5%' Containment Leakage", memo, filed 74-03600-000-2101, AECL-CO, 88-06-30,
10. G. Raiskums to R. E. Ashwell/D. Jones, "CANDU-300 Containment Gross Leakage Detection", memo, file 74-68400-050-001, AECL-CO, 87-05-01,
11. D. Chan/R. Raiskums to distribution, "Evaluation of Continuous Containment Leakage Detection Schemes", memo, file 74-68400-050-001, AECL-CO, 87-02-16.
12. H. T. Hill, "A Successful Approach to Containment integrated Leakage Rate Testing", International Conference on Containment Design and Operation, Oct. 14-17, 1990, Toronto.

What is claimed is:

1. A method of determining the leakage characteristics of the boundaries of an essentially hermetic volume comprising; maintaining the internal pressure of the volume at a value different from the ambient air pressure; continuously monitoring air mass changes within the volume preferably through measurements of pressure, temperature, relative humidity, and free volume; and reducing the error due to random variations in the measured variables for whatever cause by statistical regression on two or more variables or dimensions.

2. A method, as claimed in claim 1, wherein the boundaries of the volume are also traversed by well defined pathways permitting continuous measurement of the ingress and egress of air mass so that a mass balance of the net air mass flow across the boundary with the air mass changes within the volume yields the leakage characteristics sought.

3. A method for determining the rate of air leakage from or into a containment comprising maintaining the internal pressure of the containment at a value different from the ambient air pressure, carrying out measurements to determine $\dot{m}_{in}$, the air mass flow rate into the containment, $\dot{m}_{out}$, the air mass flow rate out of the containment and $\dot{M}_{acc}$, the rate of air mass change in the containment, applying the determined values of $\dot{m}_{in}$, $\dot{m}_{out}$ and $\dot{M}_{acc}$ to the equation $$y = (\dot{m}_{in} - \dot{m}_{out} + \dot{M}_{acc})t = k(\Delta P)^{a_1} t^{a_2}$$

where
k = leakage rate constant
$\Delta P$ = pressure differential across the containment envelope
t = time
$a_1$ and $a_2$ are constants and performing a regression analysis on the independent variables P and t to obtain values for k, $a_1$ and $a_2$, determining that the leakage flow is laminar when $a_1 = 1$ or turbulent when $a_1 = 0.5$ or combination when $0.5 < a_1 < 1$ and determining that there is a systematic error in one of the measurements if $a_2$ is other than unity.

4. A method according to claim 3 wherein the regression analysis carried out is a linear multiple logarithmic regression analysis.

* * * * *